United States Patent Office 3,423,470
Patented Jan. 21, 1969

3,423,470
PESTICIDAL PREPARATIONS AND COMPOUNDS
Otto Rohr, Therwil, and Adolf Hubele, Riehen, Switzerland, assignors to Ciba Limited, Basel, Switzerland, a Swiss company
No Drawing. Filed Dec. 5, 1966, Ser. No. 598,887
Claims priority, application Switzerland, Dec. 9, 1965, 16,986/65
U.S. Cl. 260—612   3 Claims
Int. Cl. C07c 43/20; A01n 9/20

ABSTRACT OF THE DISCLOSURE

Compounds are provided which are represented by the formula

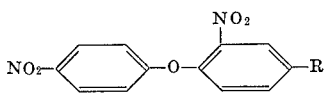

where R represents hydrogen, halogen, lower alkyl, —$NO_2$, —CN, —$SO_2CH_3$ or —$COCH_3$. The compounds of this invention are especially useful as herbicides.

---

The present invention provides preparations for combating undesired plant growth, which contain as the active substance a compound of the general formula

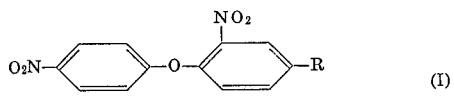

in which R represents a hydrogen atom, a halogen atom, especially a chlorine atom, an alkyl residue having 1 to 4 carbon atoms, an alkoxy residue having 1 to 4 carbon atoms, or an —$NO_2$, —CN, —SCN, —$COCH_3$, —$SCH_3$, —$SOCH_3$, —$SO_2CH_3$

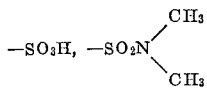

—CHO or —COOH group, together with a carrier. As carriers there may be used, for example, one or more of the following: solvents, diluents, powders, dispersing agents, wetting agents, adhesives, as well as other pesticides.

Preparations which contain, as the active substance, a compound of the general formula

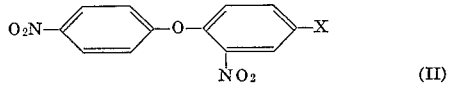

in which X represents a halogen atom, especially a chlorine atom, or a hydrogen atom, are especially advantageous.

A particularly good effect is shown by the compound of the formula

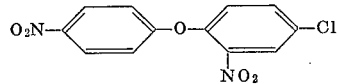

The compounds of general Formula I and especially of general Formula II show a pronounced pre-emergence and post-emergence effect, above all against various kinds of Gramineae, and surprisingly also against Cyperus, and are, for example, outstandingly suitable for combating weeds in grain cultures, rice cultures and cultures of dicotyledons.

The preparations of the present invention may contain the active ingredient in an emulsified, dispersed or dissolved form, or may be in the form of dusting agents in which the active ingredient is in admixture with a powdered solid carrier which may be, for example, another weed killer, fertiliser or pesticide. In order to manufacture solutions which may be sprayed directly it is, for example, possible to use mineral oil fractions of high to medium boiling range such, for example, as diesel oil or kerosene, furthermore coal tar oil and oils of vegetable or animal origin, as well as medium and higher hydrocarbons such, for example, as alkylated naphthalene and tetrahydronaphthalene, if desired with the use of xylene or toluene mixtures, or ketones and/or alcohols, such, for example, as cyclohexanone, cyclohexanol, and furthermore chlorinated hydrocarbons such, for example, as tetrachlorethane, trichlorobenzene, trichlorotoluene and chloroxylenol.

Forms for aqueous application are prepared from emulsion concentrates, pastes or wettable spraying powders by adding water. Suitable emulsifying or dispersing agents are nonionic products, for example, condensation products of ethylene oxide with an aliphatic alcohol, amine or carboxylic acid having a long chain hydrocarbon residue of about 10 to 30 carbon atoms, such, for example, as the condensation product of octadecyl alcohol with 25 to 35 mols of ethylene oxide or that of commercial grade oleylamine with 15 mols of ethylene oxide or that of dodecyl mercaptan with 12 mols of ethylene oxide. Amongst anionic emulsifiers which may be employed there may be mentioned the sodium salt of the sulphate ester of dodecyl alcohol, the sodium salt of dodecylbenzenesulphonic acid, the potassium or triethanolamine salt of oleic acid or abietic acid or mixtures of these acids, or the sodium salt of a petroleum sulphonic acid. Suitable cationic dispersing agents are quaternary ammonium compounds such, for example, as cetyl pyridinium bromide or dihydroxyethyl benzyl dodecyl ammonium chloride.

In order to manufacture dusting agents or powders, for example, also granules, there may be ued as solid carriers talc, kaolin, bentonite, calcium carbonate, calcium phosphate, charcoal, cork flour, wood flour and other materials. The preparations may also contain as is usual in preparations of this kind, substances which improve the distribution, adhesion, rain resistance or penetrating power; as such substances there may be mentioned, for example, fatty acids, resins, glue, casein or alginates.

Amongst weeds or undesired plant growth which may be combated with the new materials there are also here to be understood undesired culture plants which may, for example, have been grown previously on the area to be treated.

The compound of general Formula I may be manufactured by methods which are in themselves known, for example, by reacting p-nitrophenol with a compound of general formula

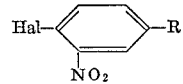

in which R has the meaning given above for compounds of the general Formula I and Hal represents a halogen atom such, for example, as a chlorine atom, with elimination of a compound H-Hal.

The present invention also provides compounds of general Formulae I and II.

The preparations of the invention, for example, when used at a concentration which does not permit any phytotoxic phenomena to arise, show a good effect against harmful microorganisms, for example, against fungi such, for example, as *Erysiph ecichoriacearum* and various others, which are of great importance as causes of plant diseases. They also show good effect against various kinds of Aspergillus as well as against bacteria. The compounds of general Formula I and II additionally possess other biocidal effects, for example, an insecticidal, acaricidal, nematocidal and molluscicidal effect. The compounds are also suitable for use as cotton defoliating agents.

The preparations of the invention may be used by themselves or together with usual pesticides, especially insecticides, arcaricides, nematocides, bactericides, fungicides or further herbicides.

The following examples illustrate the invention, the parts and the percentages being by weight.

Example 1

(1) 71 grams of p-nitrophenol are dissolved in 200 ml. of dimethylformamide with stirring and are treated with 54 grams of 10 N potassium hydroxide solution. The suspension so obtained is warmed to 120° and 96 grams of 2,5-dichloronitrobenzene dissolved in 100 ml. of dimethylformamide are added. The mixture is boiled for 2 hours under reflux and the solvent subsequently distilled off. The residue is acidified with 2 N hydrochloric acid and subjected to a steam distillation. The diphenyl ether which after cooling solidifies in the distillation flask is recrystallised from acetone/water. The compound of formula

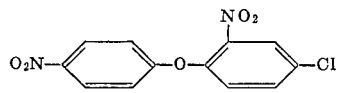

is obtained. Melting point 89 to 92°.

The following compounds were also manufactured in a similar manner:

(2)

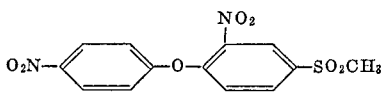

Melting point: 130–134°

(3)

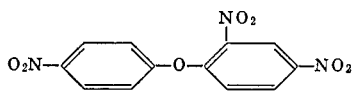

Melting point: 114–116°

(4)

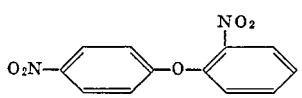

Melting point: 83–86°

(5)

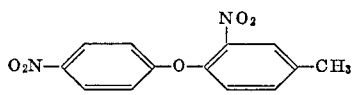

(6)

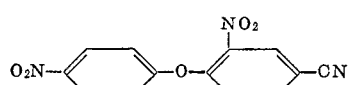

(7)

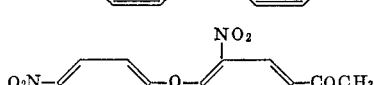

Melting point: 80–89°

8)

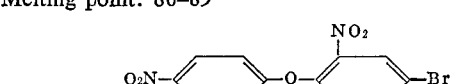

Melting point: 92–94°.

Example 2

(a) A spraying powder of the following composition was manufactured:

50% of one of the active substances listed in Example 1, under 2–7.
25% of Bolus alba (kaolin).
20% of finely divided $SiO_2$ (a product commercially available under the trade name "Hisil").
3.5% of a condensation product of 1 mol of dodecyl mercaptan with 12 mols of ethylene oxide.
1.5% of a condensation product of p-nonylphenol with 9 mols of ethylene oxide.

The finely ground mixture so obtained may be diluted with water in any desired manner to give a ready-to-use spraying liquor.

(b) 20 parts of compound 1 of Example 1 were mixed with 10 parts of a mixture of an anionic surface-active compound, preferably the calcium or magnesium salt of monolaurylbenzene monosulphonic acid, and a non-ionic surface-active compound, especially a polyethylene glycol ether of the monolauryl ester of sorbic acid, and diluted to 100 cc. with xylene. A clear solution was obtained which was used as a spray concentrate and which could be emulsified by pouring into water.

Example 3

Earthenware pots are filled with soil in a greenhouse and these are sown with the varities of seeds mentioned in Table 1.

Treatment took place one day after sowing, using a spraying liquor manufactured according to Example 2b, containing the compound of Example 1, No. 1, as the active substance. The amount used corresponded to 2.5 kg. of active substance per hectare. The results were assessed 21 days after treatment.

PRE-EMERGENT

Table 1 _____ 2.5 kg. active substance/hectare.
Wheat _____ 2.
Barley _____ 2.
Sorghum _____ 10.
Panicum _____ 9.
Poa _____ 10.
Dactaylis _____ 8.
Digitaria _____ 10.
Rapeseed _____ 2.
Carrots _____ 0.
Lettuce _____ 1.
Soja _____ 0.

0 = no effect
10 = test plants completely killed.

A similar good effect was also shown by the compounds described as Nos. 2 to 7 in Example 1.

What is claimed is:

1. A compound of the formula

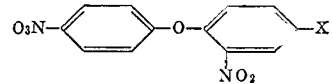

wherein X represents a halogen selected from the group consisting of chlorine and bromine.

2. The compound according to claim 1 wherein X represents chlorine.

3. The compound according to claim 1 wherein X represents bromine.

References Cited

UNITED STATES PATENTS 2,726,946  12/1955  Mussell _____ 260—612 XR
3,032,594  5/1962   Towle _____ 260—612
3,050,440  8/1962   Richter _____ 260—612 XR
3,080,225  3/1963   Wilson et al.

OTHER REFERENCES

Le Fevre et al.: Jour. Chem. Soc. (1927), pp. 1168–1173.

Reinheimer et al.: Jour. Org. Chem. (1957) vol. 22, pp. 1743–1745.

BERNARD HELFIN, *Primary Examiner.*

U.S. Cl. X.R.

71—105, 124, 103, 123; 260—465, 607, 592, 454, 609, 512, 556, 600, 520; 424—340

UNITED STATES PATENT OFFICE
CERTIFICATE OF CORRECTION

Patent No. 3,423,470　　　　　　　　　　　　January 21, 1969

Otto Rohr et al.

It is certified that error appears in the above identified patent and that said Letters Patent are hereby corrected as shown below:

Column 4, lines 46 to 49, the left-hand portion of the formula should appear as shown below:

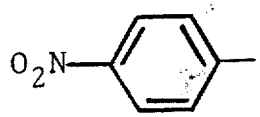

Signed and sealed this 7th day of April 1970.

(SEAL)
Attest:

Edward M. Fletcher, Jr.

Attesting Officer

WILLIAM E. SCHUYLER, JR.
Commissioner of Patents